Jan. 28, 1930. W. BAUR 1,744,944
ADJUSTABLE PEDESTAL BED
Filed Nov. 13, 1925
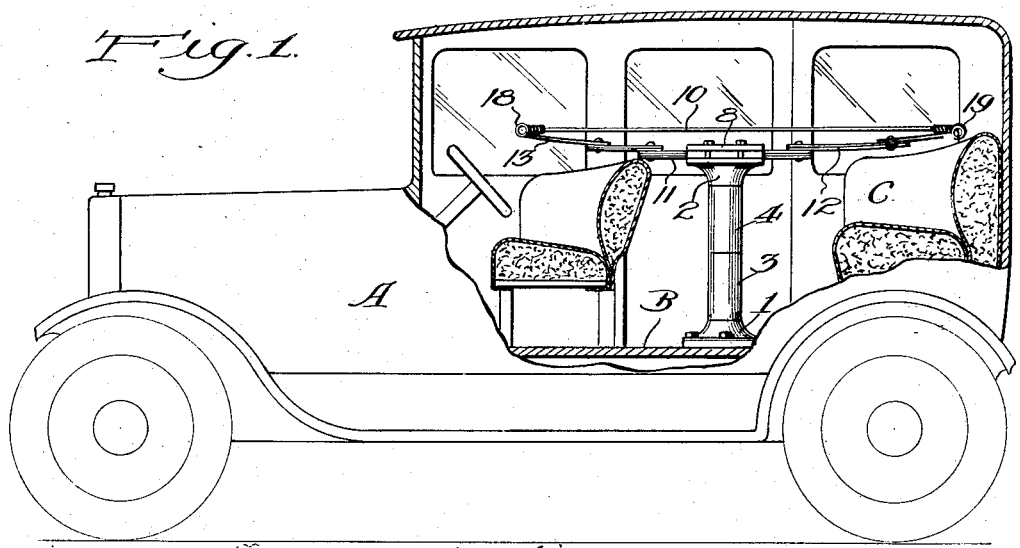
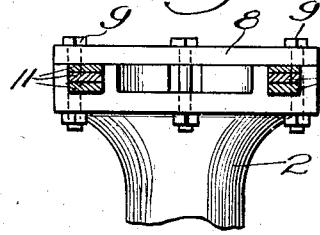
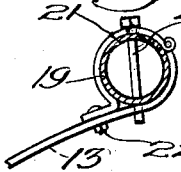
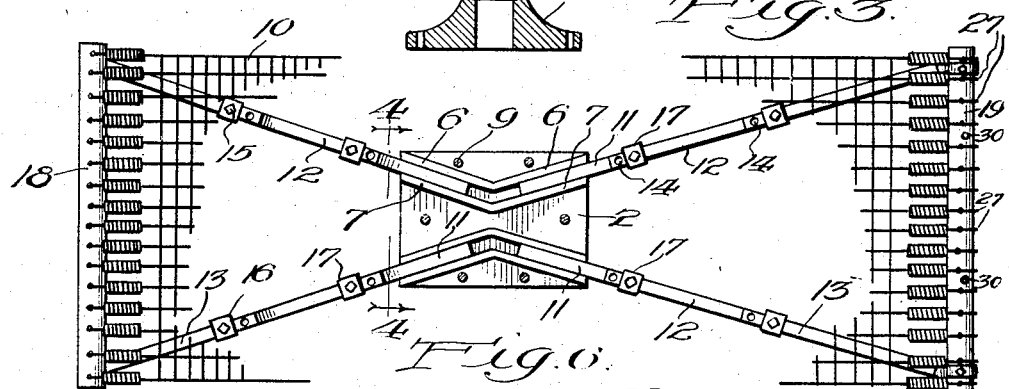

Patented Jan. 28, 1930

1,744,944

UNITED STATES PATENT OFFICE

WALTER BAUR, OF SIOUX FALLS, SOUTH DAKOTA, ASSIGNOR OF ONE-FIFTIETH TO RAY F. SMITH, OF PASADENA, CALIFORNIA

ADJUSTABLE PEDESTAL BED

Application filed November 13, 1925. Serial No. 68,758.

The present invention has for its object to produce a simple and novel bed construction which will permit the bed to be set up in a position which has perhaps only a small available floor space but sufficient room at a reasonable distance above the floor to accommodate a bed.

My invention is particularly applicable for use in closed automobiles, for the purpose of making up a bed across the tops of the seats, although it may of course be used under a great variety of conditions. Therefore it is desirable that the bed be so constructed that when not in use it may be packed in a comparatively small space, and the present invention may be said to have for one of its objects to produce a simple and novel collapsible bed that may be stored in a small space and be readily adjusted to constitute a bed.

The interior dimensions of automobile bodies vary considerable in length, and, therefore, viewed in another of its aspects, the present invention may be said to have for its object to produce a simple and novel bed that may be adjusted to vary its length to suit the size of an automobile body in which it may be used.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of an automobile of the sedan type having one of my improved beds set up therein, a portion of the automobile being broken away to show the interior;

Figure 2 is a view, partly in section and partly in side elevation, of the bed; Fig. 3 is a top plan view of the bed, the middle portion of the supporting spring being broken away and the top clamping plate on the pedestal being omitted; Fig. 4 is a section on line 4—4 of Fig. 3, but on a larger scale, showing the upper portion of the pedestal; Fig. 5 is a transverse section through one of the end supporting rods or pipes, on an enlarged scale, showing the connection between the same and one of the resilient supporting arms; Fig. 6 is a section through one of the end rods or tubes showing the connection between the same and one end of the mattress-supporting elements; Fig. 7 is a detail showing the connection between one of the supporting arms and the bar of the spring supporting element at the opposite end from the bar shown in Fig. 5; Fig. 8 is an end view of a narrow spring cushion that may be employed underneath the main spring, if desired.

I propose to mount the bed structure on a single supporting base or pedestal which, in the arrangement shown, comprises a base or foot member 1, a head member 2 and column sections 3 and 4. The several sections of the pedestal are detachably connected together, preferably by screw joints such as indicated at 5. The joints are all alike so that the head section may be fastened directly to the base section, or either of the column sections may be omitted, or both of the column sections may be employed; thus making it possible to support the bed proper at various elevations, depending upon the conditions in any particular case.

The head section of the pedestal terminates at the top in a flat surface having pairs of separated, upwardly projecting guide ribs 6 and 7 extending inwardly in a diagonal direction from the four corners. A clamping plate 8 is adapted to be laid on these guide ribs and to be detachably fastened to the head by means of bolts 9 or otherwise. The main bed spring or mattress-supporting element 10 is adapted to be supported on the ends of long arms fitted at their inner ends between the guides in the top of the pedestal, and extending at their outer ends to the four corners of the mattress-supporting element. In the arrangement shown, each arm consists of an inner section 11, an intermediate section 12 and an outer section 13. Each inner section is of such a size and shape that when it is fitted into its proper groove in the head of the pedestal, and the clamping plate 8 placed in position, it will be securely held against movement in any direction. It will be seen that the effective length of the arms may be varied by shifting them lengthwise in their guiding grooves in the head.

The arms are preferably made in whole or in part of spring steel. In the arrangement shown, each arm is made of leaves of spring steel; the inner section containing three leaves, laid one upon the other, the intermediate section containing two leaves and the outer section consisting of only a single leaf. If further adjustment of the effective lengths of the arms, than that afforded at the pedestal, is desired, the connections between the several sections of each arm may be adjustable. Furthermore, in order to permit the structure to be collapsed so that it may be packed in a small space, the connections between the several sections of each arm should be detachable. In the arrangement shown the outer section of each arm overlaps the outer end of the intermediate section and the inner end of the intermediate section overlaps the outer end of the inner section. There are two bolt holes 14, spaced apart lengthwise of the arm, at each overlap. The parts may be adjusted lengthwise of each other to bring either bolt hole in one section into registration with either bolt hole in the other section, and the several sections may then be fastened together by passing bolts 15 through the overlapped portions, only one bolt being needed at each joint. In order to give further security to each joint, I prefer to slip around the overlapped portions a short sleeve, such as indicated at 16 and 17, the bolts passing through these sleeves as well as through the leaves of the arms.

At the ends of the mattress-supporting element are rods or tubes 18 and 18, connected thereto in any suitable manner or any manner usual in ordinary bed construction. The members 18 and 19 are in turn detachably connected to the supporting arms in any suitable way. The connection between the arms and the tube 18 are best shown in Fig. 7; the tube having openings through one side to receive the members 13 of the arms and having smaller openings in the opposite side to receive reduced ends 20 on the members 13. The connections at the opposite end of the mattress-supporting element are best shown in Fig. 5; the ends of the arm members 13 extending underneath the tube 19 and having a hinged clamping section 21 which passes over the top of the tube and cooperates with the member 13 to form a clamp therefor when a bolt 22 is passed through the free end of the hinged member and the member 13. There may be registering openings through the tube and through the clamp, so that when a pin 23 is inserted through the same, the tube will be held against rotation about its long axis. It will be seen that the connection between the arms and the tube 18 prevents rotation of the tube, so that both tubes are locked in place when the structure is assembled.

While the mattress-supporting element may be of any desired construction and may be connected to the supporting bars or tubes, at the ends, any desired way, I prefer to make at least one of these connections adjustable so that the distance between the bars or tubes, and therefore the effective length of the bed, may be varied. In the arrangement shown, the mattress-supporting element has a row of springs 24 at one end, and a second row of springs 25 at the other end. The springs 24 are provided with hooks 26 that enter holes in the tube 18 and serve to connect the mattress-supporting element to this tube. The springs 25 terminate in or have fastened thereto wire cables 27 that are wrapped around the tube 19 and have their ends fastened to the tube as best shown in Fig. 6. By wrapping more or less of the length of the cables on the tube, the effective length of the bed is varied.

In assembling the bed, the parts are set up as shown, with the mattress-supporting element loose and the pins 23 withdrawn. The clamps at the ends of the supporting arms at this time form bearings in which the tube 19 may turn. Placing a bar or other implement in a hole 30 in the tube, the tube is turned, winding up the cables thereon; and when the proper tension is reached, the locking pins 23 are inserted. When the bed is to be taken apart, the pins 23 are withdrawn, allowing the mattress-supporting element to become slack. The clamps for the tube 19 are then unfastened and the mattress-supporting element may be lifted off and rolled up. As many sections of the arms as may be desired are disconnected and the pedestal is unjointed. Ordinarily the inner arm sections 11 will be left clamped in the head of the pedestal but, if desired, they may of course be removed therefrom.

The center of gravity of a person lying down is nearer the head than the feet and therefore I prefer to place the pedestal nearer one end of the bed than the other so that the weight of a person lying thereon will be balanced.

The pedestal may be made of any suitable material, although I prefer aluminum because of its lightness.

The supporting arms are shown as extending approximately to the corners of the mattress-supporting element or bed spring, but this is due to the fact that the latter is shown as being narrow. It is only necessary, however, that the points of connection between each tube or bar and the corresponding supporting arms be spaced apart from each other, preferably on opposite sides of the middle of the tube or bar, in order to balance the weight of the occupants of the bed. Furthermore, while the bed is shown as rectangular, this is not essential, since it may take any shape.

In Fig. 1, I have illustrated my bed set up in an automobile A. The pedestal rests on and is secured to the floor B and the bed proper overlies the seats C. If the pedestal should happen to be too short a board can be laid on the floor underneath the same. If the seats are collapsible or removable, the pedestal may be shortened and the bed brought nearer to the floor, if desired.

The use of my bed is not confined to closed automobiles, as the bed is equally serviceable for open vehicles or, in fact, wherever an ordinary bed or cot can be used.

When a person is lying on my improved bed he secures the benefit of the spring action of the bed spring and also of the resilient arms, so that the bed is very comfortable.

A very heavy person might press down the center of the bed spring until it rested on the pedestal, in which case there would be no resiliency of support at that point. In order to prevent such an occurrence, I provide a long narrow spring cushion 35, shown in Fig. 8, this cushion being adapted to be inserted underneath the bed spring just above the pedestal when the bed is required to sustain a heavy load.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A bed comprising a mattress-supporting spring having bars at the ends thereof and capable of being adjusted to vary the distance between said bars, a pedestal, and supporting arms extending from the pedestal to said bars and adjustable in the direction of their lengths.

2. A bed comprising a vertically-adjustable pedestal, lengthwise adjustable arms radiating from the top thereof, and a lengthwise adjustable mattress-supporting element stretched between the ends of said arms.

3. A bed comprising a pedestal, arms of spring metal radiating from said pedestal, a mattress-supporting spring mounted between the ends of said arms and supported thereby, and means for reducing the effective length of said mattress supporting spring to draw the ends of the arms toward the pedestal and raise the mattress-supporting spring with respect to the pedestal.

In testimony whereof, I sign this specification.

WALTER BAUR.